Feb. 17, 1959  B. R. SCHAAFSMA ET AL  2,874,123

PROCESS FOR THE PREPARATION OF GRANULAR COMPOSITIONS

Filed Sept. 7, 1954

Inventors
BERNARD RICHARD SCHAAFSMA
OLEV RATSEP

By George H. Mortimer
Attorney

United States Patent Office 2,874,123
Patented Feb. 17, 1959

2,874,123
PROCESS FOR THE PREPARATION OF GRANULAR COMPOSITIONS

Bernard Richard Schaafsma, Midland Park, N. J., and Olev Ratsep, New York, N. Y., assignors to Colgate-Palmolive Company, Jersey City, N. J., a corporation of Delaware Application September 7, 1954, Serial No. 454,388

11 Claims. (Cl. 252—99)

The present invention relates to a novel method of producing granular compositions of matter.

It has previously been proposed to produce granular compositions of matter by aggregating powdered hydratable inorganic salt in the presence of moisture. Also it has been proposed to heat and agitate an aqueous slurry containing hydratable alkali metal inorganic salts in such quantity as to take up as water of hydration substantially all the water in the slurry, and then to cool such compositions so as to produce a solid mass which must be pulverized or ground, such as by a ball mill for example, to produce a particulate product generally comprising particles of widely varying shape and size.

In accordance with the present invention, granular compositions of matter are produced by a process which comprises forming a flowable paste of a hydratable alkali metal inorganic salt in a quantity at least adequate to take up as water of hydration substantially all of the water to be added, water, and a granulating agent consisting of a polar organic compound having alcoholic hydroxyl as the only polar radical therein and having a molecular weight of about 150 or greater, said granulating agent being present in a quantity sufficient to cause the formation of semi-solid nodules on mixing and aeration of said flowable paste, mixing and aerating said flowable paste until semi-solid nodules have formed therein, and thereafter quiescently aging said nodule-containing mixture to produce a rigid friable mass of coherent apparently dry spheroidal agglomerate granules. This friable mass is easily decomposed to its constituent granules which form an apparently dry free flowing particulate product comprising particles of substantially uniform shape and size. The present process is eminently suited for use with compositions containing relatively small proportions of hydratable inorganic salts. Furthermore the present process operates efficiently at or only slightly above room temperature thus permitting the use of relatively simple, inexpensive operating equipment and processing of heat sensitive materials.

Figure 1:
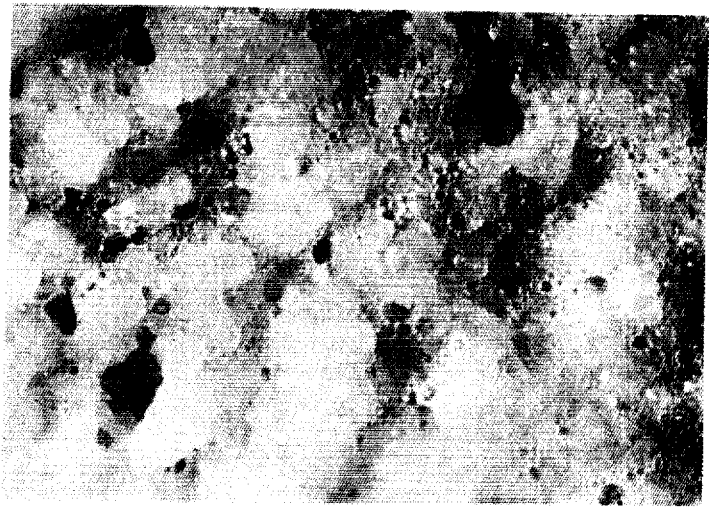
Figure 2:
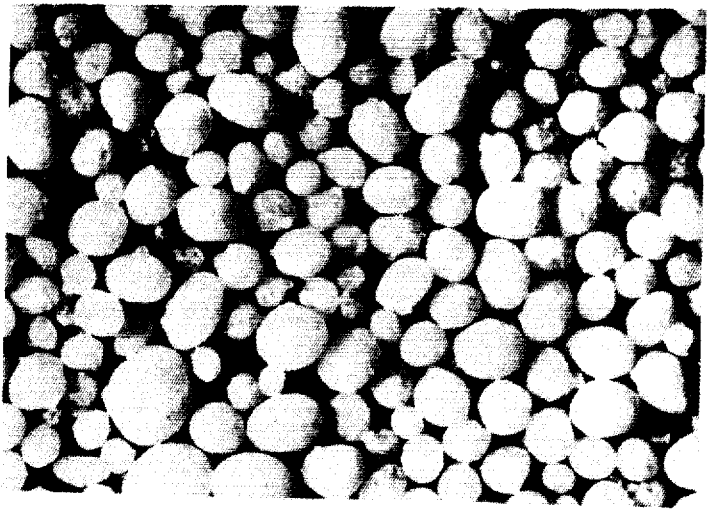

Figures 1 and 2, taken in conjunction with the following description, illustrate the present invention.

Figure 1 is a photomicrograph (taken at 10 diameters) of a typical aerated flowable paste containing semi-solid nodules. The paste of Figure 1 is ready to be aged to form an apparently dry rigid friable mass of coherent spheroidal granules. Figure 2 (also a photomicrograph taken at 10 diameters) illustrates the granules produced on disintegrating an apparently dry friable mass of spheroidal granules produced on quiescent aging of a paste such as that shown by Figure 1. The aggregative nature of the granules produced by the process of the present invention makes itself apparent on close inspection of Figure 2 which clearly shows many of the distinct coherent salt crystals which comprise each granule.

The hydratable alkali metal salts which may be used in accordance with the present invention comprise the alkali metal salts which form stable hydrates under room conditions, such for example as sodium sulfate, potassium sulfate, sodium carbonate, sodium sesquicarbonate and bicarbonate, lithium perchlorate, the hydratable alkali metal borates such as lithium metaborate and sodium perborate, and the hydratable alkali metal phosphates such as pentasodium tripolyphosphate, pentapotassium tripolyphosphate, tetrasodium pyrophosphate and mono-, di- and tri-sodium and lithium orthophosphate. If desired, anhydrous salts may be used for processing, or salts of an intermediate degree of hydration may be employed. Furthermore, mixtures of compatible hydratable salts of varying stages of hydration may be employed. It is desirable however to utilize anhydrous salts of considerable water-binding potentiality so as to be able to use a minimum proportion of such salt in the ultimate product. More particularly it is preferred to employ a mixture of Type II pentasodium tripolyphosphate and sodium carbonate or bicarbonate in ratios of from 1:4 to 4:1 by weight since such mixtures have been found to produce products of excellent granular structure which are quite freely friable. Type I pentasodium tripolyphosphate may also be used, however the products produced from Type I material are generally of a relatively finer grain size.

The granulating agent employed in accordance with the present invention is one or more of those polar organic compounds having alcoholic hydroxyl as the only polar radical therein and having a molecular weight of 150 or greater. Representative compounds which may be suitably employed include the higher molecular weight polyhydroxy or polyoxyalkylene compounds such as polyalkylene glycols and polyglycerols and their derivatives, e. g. alkyl ethers of polyethylene glycol; alkyl thio-ethers of polyethylene glycol; sterol ethers of polyethylene glycol; alkyl phenol ethers of polyethylene glycol; polyethylene glycol esters of fatty acids and other high molecular weight carboxylic acids; the corresponding ethers and esters of polypropylene glycol, polybutylene glycol, and polyglycerol; polyalkylene glycol ethers of partially esterified glycol, glycerol, sorbitol, mannitol, and various partially anhydrized derivatives thereof; and those compounds derived from the reaction of ethylene oxide with polymerized butylene oxide and other higher alkylene oxides, organic acids, anhydrides, esters, ethers, alcohols and amides. Additional suitable materials are the N-substituted alcohol amides such as the diethanol- and monoisopropanol-amides of lauric acid and myristic acid and mixtures thereof; and the higher molecular weight alcohols such as lauryl, myristyl, cetyl, oleyl and stearyl alcohols. Further suitable materials are polyvinyl alcohol; fatty acid mono- and diglycerides such as glyceryl monostearate, glyceryl dilaurate and glyceryl monoricinoleate; fatty acid monoesters of ethylene glycol such as ethylene glycol monopalmitate; and polyglycerol. In general it is preferred to use surface active polyoxyalkylene condensates with hydrophobic compounds containing at least about 8 carbon atoms, and preferably about 10 to 20 carbon atoms, e. g. the polyoxyethylene derivatives of nonyl phenol, isooctyl phenol, or tall oil which contain about 6 to about 30 ethenoxy groups per molecule. In the foregoing illustrative examples of suitable higher molecular weight and polar organic compounds, where polymers or classes of compounds are referred to it is understood of course that only those members of the appropriate class or polymeric series having an alcoholic hydroxyl as the only polar radical thereon and having a molecular weight of about 150 or greater are within the ambit of the invention.

In general, in carrying out the process of the present invention hydratable inorganic salt, granulating agent and any other non-aqueous material which it is desired to include in the final composition are mixed in a vessel equipped with means for agitating and aerating its contents. The granulating agent is preferably added as a liquid so as to facilitate its complete dispersion throughout the mass. Mixing and aeration are carried on until a uniform mixture is obtained and the proper quantity of water and any aqueous material have been added to the mix. After the aqueous materials have been added, the mixing and aerating of the mixture is continued until a flowable paste is obtained which contains semi-solid nodules as illustrated in Fig. 1 referred to previously. The formation of these nodules has been found to be expedited by the presence in the mix of sodium silicate. Thus it is preferred that the mix contain from about 3 to 14% sodium silicate solids, normally introduced as an aqueous solution having an $Na_2O:SiO_2$ ratio of from about 1:1 to about 1:3.25 for example. Depending on the particular composition involved it is preferred to continue mixing and aeration for up to about 5 to 30 minutes after the last essential component has been added so as to insure the formation of a final product of the desired, uniform grain size. The order of adding the components to be mixed is not critical except that the hydratable inorganic salt and the water or water carrying ingredients should not be mixed unless the granulating agent is present.

The mixed and aerated nodule-containing flowable paste is transferred from the mixer to a storage vessel and there it is quiescently aged until a unitary apparently dry friable mass of coherent sopheroidal granules is formed, normally a period of at least about 2 to 6 hours. On further quiescent aging the granules become harder and absorb any previously unabsorbed liquid materials present, e. g. granulating agent. Examination of a fractured portion of a properly aged rigid mass by suitable means (e. g. microscopic) reveals that the mass is composed of well defined spheroidal agglomerate granules and interstices therebetween. Apparently the granules cohere at points of contact with each other. Fracture and examination of an individual granule reveals that it is a solid aggregate of inorganic salt crystals.

In general the aged mass is ready for disintegration into its constituent granules at the end of from 6 to 8 hours, and has substantially completely hydrated or hardened within about 3 days at room temperature. By quiescent aging it is meant that the mass of material being aged is not materially disturbed internally. Of course the entire mass being aged may be transported or moved as a body, e. g. on a belt conveyor.

The aeration which occurs during the mixing after all the components have been added is substantial. The specific gravity of the paste has been found to diminish by from about 3 to 20% during this period. Pastes otherwise prepared in accordance with the present invention but which are not aerated fail to form a friable mass on quiescent aging. Further, a comparison of products made from two mixes of the same specific gravity and in which the nodules are of the same size shows that a more friable product is obtained from the paste having the larger air bubbles. This may be due to the larger bubbles bringing about a greater reduction in the contact areas between the coherent granules of the aged friable granular mass. In general, the specific gravity of the paste immediately after the addition of all components is within the range of about 1.15 to 1.25, and after mixing and aeration, the specific gravity of pastes ready to be aged is within the range of about 1.00 to 1.10.

The semi-solid nodules characteristic of the process of the present invention develop throughout the paste during mixing of the essential components. These nodules are the nuclei for the future formation of granules. Structurally they have been found to comprise a spheroidal central core of inorganic material which is covered by an outer layer of organic material. It is believed that on aging the inorganic nucleus absorbs the organic layer to form the apparently dry spheroidal agglomerate granules characteristic of the present invention.

The temperature of the components during the mixing thereof will vary depending in part upon the heat of hydration of the inorganic salts employed and the temperature of the raw materials used. As referred to previously it is preferred to use the granulating agent in liquid form and it therefore is frequently used as a solution or melt which may be above room temperature. Normally the other components are introduced into the mixer at room temperature and no particular effort is made to control the temperature of the composition which in practice seldom rises above about 105° F. to about 125° F. However if desired, the grain size of the final product may conveniently be varied to a certain extent by varying the temperature of the liquids employed in the mix. Thus it has been found that the use of warm, e. g. about 140° F., liquids tends to increase the grain size of the final product in certain instances even though the temperature of the mixture being processed apparently is not appreciably effected.

The temperature of the nodule-containing mix during aging should be within the range of about 60° F. to about 120° F. Aging at too low, e. g. 0° F. or too high, e. g. 120° F. a temperature excessively prolongs the required aging period.

The proportions of inorganic salt, water and granulating agent which are employed in carrying out the process of the present invention are closely interrelated. The amount of water used will be sufficient in conjunction with any other liquid present (e. g. liquid granulating agent), to enable the preparation of a flowable paste with components employed. However, if insufficient water is employed the product produced on aging instead of having the desired physical form may be a dense non-friable deliquescent mass, depending upon the granulating agent employed and the hygroscopic nature of the excess incompletely hydrated material. When excess water is employed, the normally friable apparently dry aged product is likely to be a pasty mass rather than the rigid apparently dry mass of coherent granules characteristic of the present invention. In general, water is employed in an amount such that the weight ratio of hydratable inorganic salt to water is from about 8:1 to about 2:1, and preferably about 6:1 to 4:1.

The amount of the hydratable alkali metal salts to be employed must be at least sufficient to form a granular product, normally at least about 25% by weight of the total composition being prepared. The hydratable salt serves to take up as water of hydration the water which is added to form a paste and also in its final state, adsorbs the organic materials present.

The amount of the polar organic compound which is employed according to the present process is that amount which causes the nodule-containing aerated flowable paste to form a friable granular mass on quiescent aging. This amount will vary of course depending upon the particular constituents of the composition being prepared. If an insufficient amount of such granulating agent is employed, the aged mix will be a solid mass resembling the non-friable products of the prior art and will require the application of considerable mechanical force to crush or grind the mass into particulate form. In general, the weight ratio of hydratable inorganic salt to granulating agent will be within the range of about 35:1 to about 2:1. The proportion of granulating agent used, however, must not be sufficient to interfere deleteriously with the desirable properties of the compositions of the present invention. For example, if an excessively large proportion of an oily polyethylene glycol derivative is employed, the final product will be an oily, non-friable mass. A preferred range of ratios of hydratable inorganic salt to granulating agent is from about 15:1 to about 2:1.

In carrying out the process of the present invention it has been found desirable to employ a light or medium duty mixer, preferably a horizontal ribbon mixer, as contrasted to a heavy duty mixer such as a kneader. Thus it has been found that a sigma blade type heavy duty mixer, for example, tends to crush the nodules which are formed, to distribute air in extremely finely divided form, and to produce a paste which is homogeneous in appearance and which on quiescent aging crystallizes to a single hard lump which is very difficult to disintegrate.

The friable mass of coherent granules produced on aging may be retained and stored as such, it may be partially sub-divided or it may be disintegrated into a particulate product consisting of its constituent granules. It is preferred to prepare such particulate products simply by placing the aged material on a vibrating screen having openings somewhat larger than the average grain size of the mass. The combination of the weight of the mass and the vibratory action of the screen is normally sufficient to break the bonds between the cohering granules thus producing a free-flowing apparently dry product consisting of solid (i. e. having its interior filled with matter; not hollow or spongy) spheroidal granules of substantially uniform composition comprising hydrated inorganic salt and granulating agent. Of course other devices for the dry reduction in size of solid materials may be employed, e. g. pebble mill, ball mill, and various impact and attrition pulverizers, but they are unnecessary and not nearly as satisfactory as the preferred method.

It is within the contemplation of this invention to include within the present compositions liquid and solid water soluble or dispersible organic and inorganic substances generally. For example, compositions containing dyes, pigments, detergents, foam and/or detergency improved additives, sequestering agents, foam depressing agents, wetting agents, water treating agents, bleaches corrosion inhibiting agents, anti-redeposition agents, and/or mixtures thereof may be prepared in the present novel form by admixing the appropriate materials with the essential components of the compositions processed according to this invention. Thus for instance, highly desirable detergent compositions may be prepared by incorporating sulfonated detergent salts such as a higher alkyl sulfate or a higher alkyl aryl sulfonate detergent salt or mixtures thereof in a composition using a detergent builder salt as a hydratable inorganic salt. Typically from 0–10% (based on the weight of the final product) of detergent sulfate or sulfonate salt may be added, and the granulating agent used may be a non-ionic detergent, preferably in liquid form, of the type consisting of polyethylene oxide condensates of suitable hydrophobic compounds having an active hydrogen e. g. alkyl phenols, higher aliphatic alcohols, tall oil, and polypropylene glycol. The molecular weight of such condensates is greater than 150. Small amounts of foam and detergency controlling and improving agents are also easily incorporated in such a product as will be illustrated by the following examples. It is to be understood that these following examples are presented for illustrative purposes and that they are not intended to limit the scope of the invention in any manner.

EXAMPLE I

The following illustrates a typical detergent composition which may be prepared according to the present invention.

| | Percent by weight |
|---|---|
| Sodium carbonate | 10.00 |
| Sodium sulfate | 20.60 |
| Anionic detergent [1] | 13.60 |
| Commercial carboxymethyl cellulose | 0.82 |
| Fluorescent dye | 0.06 |
| Iso-octyl phenoxy polyoxyethylene ethanol having about 8.5 ethenoxy groups per molecule | 10.00 |
| Cetyl alcohol | 1.50 |
| Aqueous sodium silicate (43.5% solids, $Na_2O:SiO_2$ 1.0:2.35) | 13.81 |
| Pentasodium tripolyphosphate, Type II | 25.00 |
| Water | 4.61 |

[1] The anionic detergent comprises about 30% of the sodium salt of a sulfonated alkyl benzene wherein the alkyl radical is a propylene tetramer, 68% sodium sulfate, and 2% water. The total water content of the formula is about 12.7 parts by weight.

The weighed quantities of the first five components listed above are placed in a suitable horizontal blender having a ribbon-type agitator and are thoroughly mixed and aerated by the agitator for about five minutes, after which the iso-octyl phenoxy polyoxyethylene ethanol and cetyl alcohol, which have previously been heated to melt the cetyl alcohol, are added as a mixture. In rapid succession thereafter, while mixing and aeration are continued, the aqueous sodium silicate is added, then the pentasodium tripolyphosphate is sifted in, and finally the water is added. Mixing and aeration are continued thereafter for about 15 minutes. During the addition of the phosphate, the development in the paste of innumerable semi-solid nodules becomes apparent. These nodules continue to grow and reach their final size as mixing is continued. At the end of the final mixing period the paste is allowed to flow by gravity from the mixer into storage containers (soap-frames) having removable sides. During the final mixing of the water-containing paste the specific gravity of the paste diminishes from about 1.21 to about 1.10.

The batch is allowed to age in bulk about 16 hours, about 3 to 5 hours being the minimum time within which a friable granular product is produced. After the 16 hour aging period, the retaining sides are removed from the stored vessel and the rigid mass of coherent apparently dry spheroidal granules which has formed is dropped through a grate on to a vibrating screen which disintegrates any unbroken lumps and classifies the product as to particle size.

The screened product which flows freely, consists of apparently dry solid spheroidal agglomerate granules of inorganic salt having absorbed therein the organic constituents present. A typical product prepared as directed above is described by the following screen analysis, the water content and alcohol solubility characteristics of each fraction and its pH as a 1.0% solution in distilled water also being shown in the table below, all percentages being by weight.

Table I

| On Screen Size | Weight Percent of Product Retained on Screen | Percent Alcohol Insoluble | Percent $H_2O$ In Fraction | Percent Alcohol Soluble Matter | pH |
|---|---|---|---|---|---|
| 10 | 0 | | | | |
| 12 | 1.66 | 72.28 | [1] I. S. | | 10.3 |
| 20 | 17.90 | 71.87 | 11.20 | 16.93 | 10.3 |
| 40 | 42.46 | 73.58 | 11.20 | 15.22 | 10.3 |
| 60 | 21.70 | 73.55 | 12.00 | 15.33 | 10.3 |
| 80 | 13.85 | 71.00 | 11.12 | 17.15 | 10.3 |
| 100 | 1.07 | 70.85 | [1] I. S. | | 10.3 |
| Through 100 | 0 | | | | |

[1] Insufficient sample for analysis.

None of the product passes through a 100 mesh screen. The composition of the product is substantially uniform throughout the entire range of particle sizes as shown by the analyses in Table I.

If the iso-octyl phenoxy polyoxyethylene ethanol is omitted from the above composition, a hard, non-friable solid lump is produced on aging, the quantity of cetyl alcohol present being insufficient to cause granulation on aging. As the iso-octyl phenoxy polyoxyethylene ethanol content of the composition processed is varied, the following is observed:

Table II

| Weight Percent of Iso-Octyl Phenoxy Polyoxyethylene Ethanol Present | Result |
|---|---|
| 0–2 | Heavy crystalline mass. |
| 3–4 | Granular product of poor friability. |
| 5–15 | Freely friable granular product. |
| 20 | Non-friable granular product which is oily and forms a paste on very little working. |

The iso-octyl phenoxy polyoxyethylene ethanol of this example may be replaced by the commercial fatty alcohols derived from coconut oil, by lauric or myristic diethanolamide or mixtures thereof, and by the ethylene oxide condensate of polymerized propylene glycol containing about 40–50% ethylene oxide and having a molecular weight of about 4500.

If the sodium carbonate of this example is entirely replaced by sodium bicarbonate, the requisite minimum aging time is increased. Replacing the Type II pentasodium tripolyphosphate with Type I material reduces the grain size of the product.

EXAMPLE II

The sodium carbonate of Example I is entirely replaced by Type II pentasodium tripolyphosphate. A satisfactory product is obtained on only one hour's aging.

EXAMPLE III

Products very similar to those of Example I are produced according to the following formula:

| | Percent by weight |
|---|---|
| Soda ash | 10.00 |
| Sodium sulfate | 28.59 |
| Carboxymethylcellulose | 0.81 |
| Fluorescent dye | 0.06 |
| Anionic detergent [1] | 9.09 |
| Nonyl phenoxy polyoxyethylene ethanol having about 8.5 ethenoxy groups per molecule | 10.00 |
| Aqueous sodium silicate of Example I | 13.79 |
| Pentasodium tripolyphosphate, Type II | 25.00 |
| Water | 2.66 |

[1] The anionic detergent is an aqueous slurry containing 50% by weight of solids which consist of 88% by weight of the sodium salt of an alkylated benzene wherein the alkyl radical contains about 12 carbon atoms and 12% sodium sulfate.

The process steps are the same as those in Example I except that the cetyl alcohol is omitted and the iso-octyl phenoxy polyoxyethylene ethanol is not heated.

Excellent products may also be prepared by replacing the 10% of nonyl phenoxy polyoxyethylene ethanol by 8% of an ethylene oxide condensation product of tall oil containing about 16 ethenoxy groups per molecule and 2% of sodium sulfate.

EXAMPLE IV

A satisfactory product is prepared by mixing in a horizontal ribbon mixer:

| | Percent by weight |
|---|---|
| Soda ash | 35 |
| Sodium sulfate | 27.8 |
| Anionic detergent of Example III | 9 |
| Iso-octyl phenoxy polyoxyethylene ethanol containing about 8.5 ethenoxy groups | 10 |
| Cetyl alcohol | 1.5 |
| Sodium silicate of Example I | 14 |
| Water | 2.7 |

The ingredients are added to a horizontal ribbon mixer in the order shown above, each component being thoroughly mixed with the previously added materials before another component is added. The cetyl alcohol is added as a melt in the iso-octyl phenoxy polyoxyethylene ethanol, the melt being at about 130° F. After the water is added, solid nodules form within a few minutes. Mixing and aeration are continued for about 20 minutes more, and then the mix and aerated paste is flowed by gravity into storage containers. The product is a friable mass of solid spheroidal granules which is easily disintegrated into its constituent granules by the pressure of its own weight on vibrating screens.

EXAMPLE V

Products are made according to the procedure and formulation of Example I except that the amount of sodium sulfate therein is varied so as to permit varying amounts of several different polyethylene oxide condensates of differing ethenoxy chain lengths to be employed. The total water content of the paste also is varied in conjunction with the sodium sulfate as to obtain a flowable paste with the mixture being processed. The friability of the final products is evaluated by the ease with which the aged mass may be crumbled by hand to yield the free flowing smooth spheroidal granules characteristic of the present invention. The ease of crumbling is evaluated using an arbitrary scale of 1 to 10, 10 representing an aged mass which freely disintegrates on the slightest handling whereas 1 represents a product obtained where there is no granulating agent employed, which is a dense hard crystalline non-granular mass virtually impossible to crush by hand, and which if crushed by the application of sufficient force, yields a power of irregularly shaped particles rather than the spheroidal granules characteristic of the present invention. The results of such tests appear in Table III below.

*Table III*

| Condensate | No. Ethenoxy Groups Per Mole of Condensate | Weight Percent Condensate | Weight Percent Total Water | Friability of Aged Product |
|---|---|---|---|---|
| None | | | 15.0 | 1 |
| None | | | 22.5 | 1 |
| A | 4.5 | 10 | 15 | 7 |
| B | 6.0 | 10 | 15 | 8 |
| C | 9.5 | 10 | 15 | 9 |
| D | 15.0 | 10 | 15 | 9 |
| E | 30.0 | 10 | 15 | 9 |
| A | 4.5 | 5 | 15 | 2 |
| B | 6.0 | 5 | 15 | 3 |
| C | 9.5 | 5 | 15 | 5 |
| D | 15.0 | 5 | 15 | 8 |
| E | 30.0 | 5 | 15 | 8 |
| A | 4.5 | 3 | 15 | 1 |
| B | 6.0 | 3 | 15 | 2 |
| C | 9.5 | 3 | 15 | 5 |
| D | 15.0 | 3 | 15 | 4 |
| E | 30.0 | 3 | 15 | 3 |
| E | 30.0 | 2.9 | 17.5 | 9 |
| E | 30.0 | 2.8 | 20.0 | 8 |
| E | 30.0 | 2.7 | 22.5 | 4 |
| F | 9.5 | 10 | 15.0 | 9 |
| G | 4 | 10 | 15.0 | 9 |
| G | 4 | 5 | 15.0 | 9 |
| G | 4 | 3 | 15.0 | 2 |
| H | 23 | 10 | 15.0 | 9 |
| H | 23 | 5 | 15.0 | 8 |
| H | 23 | 3 | 15.0 | 8 |
| J | 9.5 | 10 | 15.0 | 10 |

Condensate A—Nonyl phenol condensed with about 4.5 moles of ethylene oxide.
Condensate B—Nonyl phenol condensed with about 6.0 moles of ethylene oxide.
Condensate C—Nonyl phenol condensed with about 9.5 moles of ethylene oxide.
Condensate D—Nonyl phenol condensed with about 15.0 moles of ethylene oxide.
Condensate E—Nonyl phenol condensed with about 30.0 moles of ethylene oxide.
Condensate F—Dodecyl phenol condensed with about 12.5 moles of ethylene oxide.
Condensate G—Lauryl alcohol condensed with about 4 moles of ethylene oxide.
Condensate H—Lauryl alcohol condensed with about 23 moles of ethylene oxide.
Condensate J—Ethyl hexyl phenol condensed with about 9.5 moles of ethylene oxide.

EXAMPLE VI

The following detergent composition is prepared according to the process of Example I:

| | Percent by weight |
|---|---|
| Soda ash | 10.00 |
| Sodium perborate tetrahydrate | 10.00 |
| Sodium sulfate | 17.12 |
| Commercial carboxymethylcellulose | 0.82 |
| Fluorescent dye | 0.06 |
| Anionic detergent slurry of Example III | 8.73 |
| Nonyl phenoxy polyoxyethylene ethanol containing about 9.5 ethenoxy groups per mole | 10.00 |
| Cetyl alcohol | 1.50 |
| Aqueous sodium silicate | 13.79 |
| Pentasodium tripolyphosphate | 25.00 |
| Water | 2.83 |
| Perfume | 0.15 |

The final freely flowing particulate product has an apparent density about 45% lower than that of a product prepared in a similar manner wherein the sodium perborate is replaced by sodium sulfate. This effect is believed to be caused by efficient aeration of the mix by oxygen released by partial decomposition of the perborate during processing, however this decomposition is not extensive as the final product has substantial bleaching power.

In the place of sodium perborate other per salts such as persulfates, persilicates and perphosphates may be used.

EXAMPLE VII

The following components are placed in a beaker and are stirred rapidly by hand with a glass rod:

| | Parts by weight |
|---|---|
| Pentasodium tripolyphosphate, Type I | 25 |
| Iso-octyl phenoxy polyoxyethylene ethanol containing about 9.5 ethenoxy groups per mole | 10 |
| Water | 8 |

The mix is agitated and aerated for about 5 minutes during which innumerable semi-solid nodules appeared, and then is allowed to age quiescently in the beaker for several hours.

A granular product of fair friability is obtained.

EXAMPLE VIII

The procedure of Example VII is followed using the following formula:

| | Parts by weight |
|---|---|
| Pentasodium tripolyphosphate, Type I | 25 |
| Ethylene oxide condensate of Example VII | 10 |
| Water | 15 |
| Soda ash | 10 |

The added water is necessary to prepare a fluid paste because of the added soda ash as compared to the formula of Example VII.

A granular product of fair friability is obtained.

EXAMPLE IX

Satisfactory products may be made according to the process of Example I using the following formula:

| | Percent by weight |
|---|---|
| Soda ash | 8.75 |
| Sodium sulfate | 18.87 |
| Commercial sodium carboxymethyl-cellulose | 0.82 |
| Fluorescent dye | 0.06 |
| Anionic detergent slurry of Example III | 8.73 |
| Tridecyl alcohol condensed with about 16 moles of ethylene oxide | 10.00 |
| Cetyl alcohol | 1.50 |
| Aqueous sodium silicate of Example I | 13.79 |
| Pentasodium tripolyphosphate | 35.00 |
| Water | 2.83 |
| Perfume | 0.15 |

The total water content of the mixture is about 15%. The inorganic sodium salts employed may be replaced by the equivalent potassium salts.

Although the present invention has been described with reference to particular embodiments and examples, it will be apparent to those skilled in the art that variations and modifications of this invention can be made and that equivalents can be substituted therefor without departing from the principles and true spirit of the invention.

Having thus described the invention, what is claimed is:

1. A process comprising forming a flowable paste of hydratable alkali metal inorganic salt in a quantity at least adequate to take up as water of hydration substantially all of the water to be added, water in an amount sufficient to form a flowable paste, and a granulating agent consisting of a polar organic compound having alcoholic hydroxyl as the only polar radical therein and having a molecular weight of about 150 or greater, said granulating agent being present in a quantity sufficient to cause the formation of semi-solid nodules on mixing and aeration of said flowable paste, mixing and aerating said flowable paste until semi-solid nodules have formed therein, and thereafter quiescently aging said nodule-containing mixture to produce a rigid friable mass of coherent apparently dry spheroidal agglomerate granules.

2. The process of claim 1 wherein said rigid friable mass is decomposed to its constituent granules to form an apparently dry free-flowing particulate product.

3. A process as set forth in claim 2 wherein sodium perborate is incorporated in said flowable paste.

4. A process for preparing a detergent composition, which process comprises forming a flowable paste of hydratable alkali metal inorganic salt, liquid non-ionic detergent, and water, the weight ratio of said hydratable inorganic salt to said non-ionic detergent being within the range of about 35:1 to 2:1 and the weight ratio of said hydratable inorganic salt to water being within the range of about 8:1 to 2:1, mixing and aerating said flowable paste until semi-solid nodules have formed therein, and thereafter quiescently aging said nodule-containing mixture to produce a detergent composition in the form of a rigid friable mass of coherent apparently dry spheroidal agglomerate granules.

5. A process as set forth in claim 4 wherein the hydratable alkali metal inorganic salt is a phosphate.

6. A process as set forth in claim 4 wherein the hydratable alkali metal inorganic salt comprises a mixture of pentasodium tripolyphosphate and soda ash, the weight ratio of said phosphate to soda ash being within the range of about 1:4 to 4:1.

7. A process as set forth in claim 4 wherein the liquid non-ionic detergent comprises an ethylene oxide condensate of an alkyl phenol, said condensate containing about 6 to 30 ethenoxy groups per molecule.

8. A process as set forth in claim 4 wherein the mixed and aerated nodule-containing mixture has a specific gravity within the range of about 1.0 to 1.10 before aging.

9. A process as set forth in claim 4 wherein the mixture of hydratable alkali metal inorganic salt, liquid non-ionic detergent, and water is mixed and aerated for about 5 to 30 minutes.

10. A process as set forth in claim 5 wherein the mixture of hydratable inorganic salt, liquid non-ionic detergent, and water contains about 3 to 14% by weight of sodium silicate.

11. A process comprising mixing and aerating a mixture of sodium carbonate, sodium sulfate and sodium tetrapropylene benzene sulfonate, continuing said mixing and aerating while forming an aerated flowable paste by adding successively to said mixture a sufficient quantity of a liquid mixture of cetyl alcohol and iso-octyl phenoxy polyoxyethylene ethanol having about 8.5 ethenoxy groups per molecule to cause the formation of semi-solid nodules on mixing and aeration of said flowable paste, aqueous sodium silicate, pentasodium tripolyphosphate, and water, the total quantity of water added being sufficient to form a flowable paste and the total amount of hydratable inorganic salts present being sufficient to take up as water of hydration substantially all of said water, continuing mixing and aerating said flowable paste for about 15 minutes to cause the formation of semi-solid nodules, quiescently aging said nodule containing aerated paste for at least about 3 hours to produce a friable granular mass of coherent spheroidal granules, disintegrating said friable mass, and recovering the apparently dry spheroidal granules thus produced.

References Cited in the file of this patent

UNITED STATES PATENTS

| | | |
|---|---|---|
| 2,154,977 | Furness | Aug. 18, 1939 |
| 2,480,730 | Hafford | Aug. 30, 1949 |
| 2,622,068 | Hizer | Dec. 16, 1952 |
| 2,746,929 | Wells | May 22, 1956 |
| 2,746,930 | Wells | May 22, 1956 |

FOREIGN PATENTS

| | | |
|---|---|---|
| 490,285 | Great Britain | Aug. 11, 1938 |

UNITED STATES PATENT OFFICE
CERTIFICATE OF CORRECTION

Patent No. 2,874,123                               February 17, 1959

Bernard Richard Schaafsma et al.

It is hereby certified that error appears in the printed specification of the above numbered patent requiring correction and that the said Letters Patent should read as corrected below.

Column 2, line 44, before "mono-", first occurrence, strike out "and"; column 5, line 27, for "improved" read -- improving --; column 6, line 26, for "stored" read -- storage --.

Signed and sealed this 11th day of August 1959.

(SEAL)
Attest:

KARL H. AXLINE                                                  ROBERT C. WATSON
Attesting Officer                                           Commissioner of Patents